Feb. 6, 1940.  R. V. HALEY ET AL  2,189,465
WINDSHIELD OR THE LIKE
Filed Oct. 8, 1937
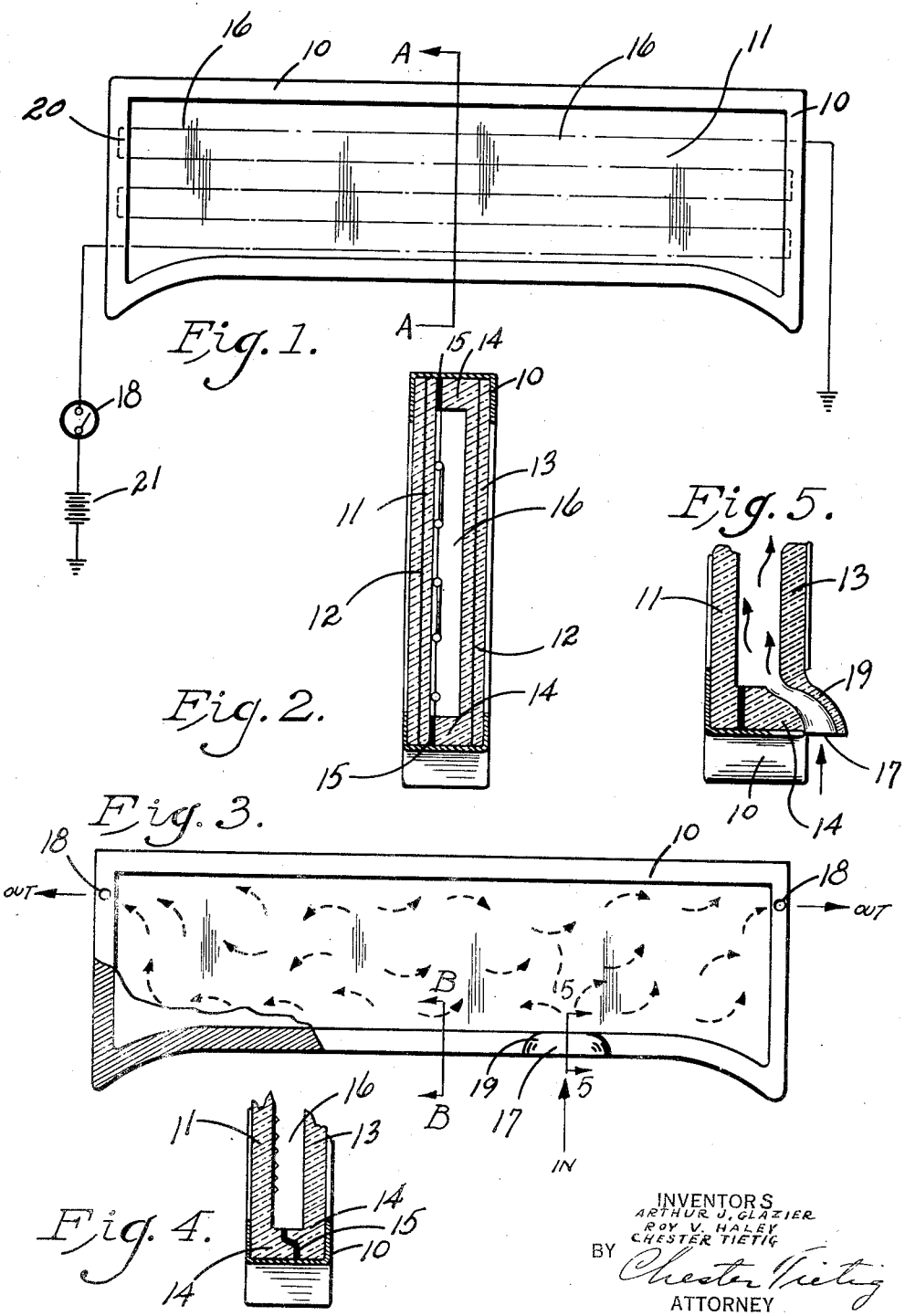
INVENTORS
ARTHUR J. GLAZIER
ROY V. HALEY
CHESTER TIETIG
BY
ATTORNEY

UNITED STATES PATENT OFFICE 2,189,465

WINDSHIELD OR THE LIKE

Roy V. Haley and Arthur J. Glazier, Cincinnati, Ohio, and Chester Tietig, Covington, Ky.

Application October 8, 1937, Serial No. 168,034

8 Claims. (Cl. 20—40.5)

This invention relates to non-fogging windshields, especially for motor vehicles, aircraft and the like but permissible for house or trailer windows.

Among the objects of the invention is to provide a windshield that will not allow its inner surface, i. e. the one nearest the interior of the vehicle, to grow cold enough to condense moisture.

Another object is to provide a double windshield adapted to be heated in the space between the sheets, either electrically or otherwise.

Another object is to provide a construction especially adapted to the use of transparent, stiff sheets of synthetic resin materials and to provide integrally molded anti-dazzle means in such a windshield.

Briefly stated, one of our modifications has an evacuated space between the sheets, another utilizes the space between the sheets as a passage for the traverse of warm air, while a third, in which resin material is utilized, has a surface of intermittent prism corrugations on one of the surfaces adjacent the space.

Referring to the drawing,

Figure 1 is a front elevation of our shield showing the arrangement of the heating wires.

Figure 2 is a sectional elevation of the shield taken on the line A—A of Figure 1, the left side of Figure 2 being arranged toward the front of the vehicle.

Figure 3 is a front elevation of a modification in which warm air is adapted to circulate between the sheets.

Figure 4 is a fragmentary sectional elevation of Figure 3 taken on the line B—B of that figure, but still further modified to show the construction used when plastic materials are employed.

Figure 5 is a side elevation illustrating a construction intended to receive heated air from a hot air duct in the cowl of the car (not shown). This elevation is taken on the line 5—5 of Figure 3.

10 is the channel steel windshield binding which encloses about its edges a forward sheet 11 which may be of ordinary plate glass or else the conventional "safety glass", i. e. that in which two glass sheets are cemented together by a synthetic resin or Celluloid filling 12. A rear sheet 13 may be of the same material as the forward sheet. The two sheets are so shaped and disposed to each other as to create and enclose a thin cavity 16 which is practically coextensive with the glass sheets except for about a one inch margin. This is filled with cementing material, preferably of synthetic resin of a character which will create a vacuum tight joint, say cellulose acetate or methyl methacrylate ("Lucite" which has pronounced anti-slivering qualities and a "mushy" fracture).

In order to space sheets 12 and 13 a suitable distance apart, say ¼ inch, a "boot" or extension edge 14 may be provided on one of them as shown in Figure 2. This "boot" need not be integral with any of the sheets but may consist of four narrow strips of glass, say 1 inch wide, used merely as spacers, but sealed to all sheets with synthetic resin in a vacuum tight manner as shown at 15.

In the cavity and adjacent the forward sheet 11 there is an electrical resistance wire 16 arranged in a plurality of horizontal loops, the ends 20 of which are embedded in the synthetic resin seal 15 so as to hold the wire under slight tension and against the inner surface of sheet 11. This is necessary because the wire is intended to heat sheet 11, not sheet 13, and heat is not transmitted through a vacuum. The energy necessary to heat the wire is supplied from a battery 21 through a circuit grounded to the vehicle frame and comprising a switch 18.

If sheet 11 is made wholly of synthetic resin, the wire 16 may be and is preferably molded into the interior of the sheet.

Referring to Figure 4, which shows the use of synthetic resin materials, the "boot" 14 is here made integral with both sheets and at the junction of the boots they are constructed to fit to form a seal staggered or sinuous in section. This is to increase the length and so the strength of the seal and its vacuum-holding properties. We prefer that both sheets 11 and 13 be made of transparent methyl methacrylate resin ("Lucite") and that the cementitious material at 15 be powdered Lucite. The sealing is preferably done in a hydraulic press with a heated platen and die.

Since it is almost no extra trouble in manufacturing these sheets to mold corrugations into them, we prefer that the inner surface of sheet 11 be provided with integral horizontal prisms about 1/16" wide and 1/8" apart. This spacing allows the driver to see the road well enough but breaks up a large amount of the incoming light from the headlights of oppositely passing cars. The prisms will not collect dirt because they are in a protected position.

While the construction in which cavity 16 is highly evacuated and hermetically sealed is preferred, the modifications shown in Figure 3 may be employed in which there are openings 17 and 18 (inlet and outlet respectively) in the sealing material between sheets 11 and 13, for warm air. This air should be supplied in any suitable manner from a hot-fluid type heater within the car body. Exhaust gas should not be used on account of its too high heat and content of impurities. If desired, the openings 17 and 18 can be located crosswise of sheet 13, i. e. piercing it thereby directing the cooled air back into the car. Any suitable position for the openings may be chosen.

If sheet 13 is made from synthetic resin, then the middle of the lower edge may be belled out as shown in Figures 3 and 5 so that the interior cavity of the shield will receive heated air from the air duct or ducts built into the cowl of 1936 or 1937 cars such as Hudson and Chrysler and many other cars since. This belled out portion 19 acts as and renders any other inlet port unnecessary. The amount of belling is just sufficient to insure that the entire stream of heated air from the duct will flow into the cavity between the two sheets of the windshield.

In this application it should be recognized that the synthetic resin "Styrene" is the full equivalent of "Lucite." It is the spirit of the invention that shields in which one sheet is made of glass and the other of resin are included in its scope. The sealing material may be glass and the seal may be made by fusion. The entire windshield, that is two sheets with a cavity between, may be made from a unitary piece of glass and the seal may be an autogenous weld of the edges of the two sheets.

We claim as our invention:

1. In a windshield or the like, a forward sheet of transparent, stiff material, a rearward sheet of transparent synthetic resin material, said latter sheet having molded therein a belled portion being adapted to extend over the delivery end of an air duct in the vehicle in which the windshield is used, spacing material between said sheets, at substantially the margins thereof only, sealing material binding said sheets and spacing material together, said spacing and sealing material being so arranged as to provide an air inlet to the enclosed cavity at the belled portion and an air exit from another portion of the shield.

2. A windshield comprising two transparent synthetic resin sheets, one of said sheets being belled at one edge, the two sheets being joined substantially entirely about their margins with synthetic resin material, except at the belled portions and at other portions remote from the belled portions, said unjoined, non-belled portions being adapted to constitute openings providing outlets for the air received through the belled portions.

3. A windshield comprising two sheets of transparent material spaced substantially at their margins to enclose a thin flat cavity between them, one of said sheets being belled out at one of its edges, said sheet being provided with an opening through it at a point remote from the belled portion, by an operative connection with the cavity between the sheets.

4. A windshield comprising two sheets of synthetic resin material, joined substantially at their margins, one of said sheets being belled at one of its edges, said belled sheet being provided also with at least one opening therethru, said opening communicating with the thin flat space enclosed between said sheets.

5. A windshield comprising two sheets of transparent material, one of said sheets having a belled portion at one of its edges and a curved portion of rigid filling material under said belled portion and attached to the unbelled sheet, said filling material being adapted to cooperate with said belled portion to establish a curved air admission channel communicating with the thin flat space enclosed between the main portion of said sheets.

6. A windshield or the like comprising a sheet made at least partially of glass, said glass being on its outer surface, a sheet made of transparent synthetic resin having pronounced anti-slivering qualities, a belled portion on said resin sheet adjacent one edge thereof, thin spacing material between said sheets at the margins thereof and a channelled binder enclosing said assembly by its margins except at said belled portion.

7. A windshield or the like comprising an outer sheet made at least partially of glass, said glass being on its outer surface, an inner sheet made of transparent synthetic resin having pronounced anti-slivering qualities, a belled portion on said inner sheet at the lower edge thereof, thin spacing material between said sheets at the margins thereof and a channelled metal-comprising binder enclosing said assembly by its edges, except at said belled portion.

8. A windshield or the like comprising two sheets of stiff transparent sheet material, spacing material between said sheets at only the margins thereof, a channelled frame for holding said elements together at their margins, a belled portion on one of said sheets at one margin thereof, said belled sheet having also an opening communicating with the free space between said sheets and being remote from the belled portion.

ROY V. HALEY.
ARTHUR J. GLAZIER.
CHESTER TIETIG.